(12) United States Patent
Gane et al.

(10) Patent No.: US 8,080,595 B2
(45) Date of Patent: Dec. 20, 2011

(54) PROCESS FOR GRINDING IN AN AQUEOUS MEDIUM OF MINERAL MATTER AND BINDERS USING A REVERSE EMULSION OF A POLYMER ACRYLAMIDE WITH AN ACRYLIC MONOMER

(75) Inventors: Patrick Gane, Rothrist (CH); Philipp Hunziker, Bern (CH); Joachim Schoelkopf, Killwangen (CH)

(73) Assignee: Omya Development AG, Oftringen (CH)

( * ) Notice: Subject to any disclaimer, the term of this patent is extended or adjusted under 35 U.S.C. 154(b) by 162 days.

(21) Appl. No.: 12/451,132

(22) PCT Filed: May 6, 2008

(86) PCT No.: PCT/IB2008/001114
§ 371 (c)(1),
(2), (4) Date: Nov. 18, 2009

(87) PCT Pub. No.: WO2008/139292
PCT Pub. Date: Nov. 20, 2008

(65) Prior Publication Data
US 2010/0120948 A1    May 13, 2010

(30) Foreign Application Priority Data
May 11, 2007    (EP) .................................... 07290603

(51) Int. Cl.
*C09B 67/00*    (2006.01)

(52) U.S. Cl. .......................... 523/333; 524/460; 524/555
(58) Field of Classification Search .................. 523/333; 524/460, 555
See application file for complete search history.

(56) References Cited

U.S. PATENT DOCUMENTS

| | | | |
|---|---|---|---|
| 5,318,624 | A | 6/1994 | Corbin |
| 6,136,305 | A | 10/2000 | Michel-Lecocu et al. |
| 2004/0250970 | A1 | 12/2004 | Qiu et al. |

FOREIGN PATENT DOCUMENTS

| | | |
|---|---|---|
| EP | 1 167 475 A2 | 1/2002 |
| FR | 2 818 165 A1 | 6/2002 |
| WO | WO 93/11183 | 6/1993 |
| WO | WO 03/074786 A2 | 9/2003 |
| WO | WO 2004/041882 A2 | 5/2004 |
| WO | WO 2006/008657 A2 | 1/2006 |
| WO | WO 2006/016036 A1 | 2/2006 |

OTHER PUBLICATIONS

Co-pending U.S. Appl. No. 11/629,580, filed Jan. 3, 2007.*
The International Search Report for PCT Application No. PCT/IB2008/001114.
The Written Opinion of the International Searching Authority for PCT Application No. PCT/IB2008/001114.

* cited by examiner

*Primary Examiner* — Edward Cain
(74) *Attorney, Agent, or Firm* — Amster, Rothstein & Ebenstein LLP; Craig J. Arnold

(57) ABSTRACT

The invention consists of a process for preparation of self-binding pigmentary particles, dry or in aqueous suspension or dispersion, using in a particular stage of the process a reverse emulsion formed from a dispersion in an oily phase of water particles and of at least one polymer of acrylamide with an acrylic monomer.

55 Claims, No Drawings

PROCESS FOR GRINDING IN AN AQUEOUS MEDIUM OF MINERAL MATTER AND BINDERS USING A REVERSE EMULSION OF A POLYMER ACRYLAMIDE WITH AN ACRYLIC MONOMER

This is a U.S. national phase of PCT Application No. PCT/IB2008/001114, filed May 6, 2008, which claims the benefit of European Application No. 07 290 603.5, filed May 11, 2007.

The invention concerns the general field of grinding in an aqueous medium of mineral matter in the presence of binders.

Mineral particles and polymer binders are 2 essential components used in the manufacture of numerous materials, such as for example plastics. Mineral particles, such as calcium carbonate, notably contribute mechanical and optical properties to the end part; as for binders, generally in the form of emulsions stabilised by surfactants, they provide the cohesion required for all the constituents of the end material.

For some ten years the concept of particles which, in the form of a unique product, contribute both the properties of the pigmentary material and of the binder, has been developed: the term "self-binding pigmentary particles" is used in this connection. Such products are obtained by grinding in an aqueous medium of mineral matter in the presence of the polymeric binder. This process leads to particles consisting at once of the binder and of the original pigmentary material: the binder and the mineral matter are intimately linked within these self-binding pigmentary particles. The cohesion of such particles is notably improved relative to the cohesion of a simple blend between the pigmentary material and the binder, as illustrated in document WO 2006/008657, which will be discussed in greater detail below in the present application.

The processes concerned by the present application are therefore processes using at least one stage of grinding in an aqueous medium of at least one mineral matter and at least one polymeric binder. Possible stages of dispersion, concentration and drying may follow.

This type of process poses 2 major problems for the skilled man in the art. The first of these relates to the general phenomenon of sedimentation of self-binding pigmentary particles, which are in suspension in water. The skilled man in the art then seeks to improve the stability of the aqueous suspensions of these self-binding pigmentary particles, in order to be able to store or transport these suspensions, possibly over long periods: he seeks to reduce the sedimentation phenomenon.

Secondly, if polymeric binders are present during the stage of grinding in the aqueous medium, since these binders take the form of emulsions stabilised by surfactants, the said surfactants are subject to high mechanical stresses during the grinding operation: the formation of foam is observed. This foam has the disadvantage that it ultimately impairs certain properties (notably optical properties) of the compositions manufactured from the aqueous suspensions of self-binding pigmentary particles. In addition, the formation of foam causes industrial constraints, notably in terms of the transfer of the suspensions of self-binding pigmentary particles to the storage tanks.

The prior art relative to the processes of manufacture of self-binding pigmentary particles in aqueous suspension will be discussed below, in order to find the solutions proposed for the skilled man in the art to resolve this twin problem of foaming and of sedimentation of the suspensions obtained.

Document WO 2005/111153 describes a process of manufacture of particles in aqueous suspension by grinding of pigmentary fillers with polymeric binders, in the presence of dispersing agents such as polyacrylates. The particles obtained in this manner can then be used in the manufacture of paints and paper coatings. However, this document provides the skilled man in the art with no information whatever concerning any possible solutions which might be devised to the problems of sedimentation and foaming for the aqueous suspensions obtained, in that it does not even mention these 2 disadvantages.

Document WO 93/11183 describes a process for manufacture of an aqueous suspension of particles consisting of a pigmentary material and a polymeric binder, by blending, but also grinding (page 33, lines 33-34) in an aqueous medium. The characteristic of this process lies in the regulation of the Zeta potential of the initial suspension of pigmentary material, notably by means of a dispersing agent enabling the surface potential of the mineral filler to be adjusted to a value of between 0 and −50 mV. By this means a stable dispersion of self-binding pigmentary particles is obtained which can be used in the composition of various coatings such as paints.

Firstly, this document stresses the possibility of using thickening agents in the process it describes, notably cellulosic or acrylic agents in a direct emulsion (and possibly associative acrylics).

The skilled man in the art is fully aware that the role played by these thickening agents is to limit the phenomenon of sedimentation of the particles, notably by increasing the viscosity of the medium. These solutions based on cellulosic or acrylic thickening agents in a direct emulsion are well-known to the skilled man in the art, in the sense that they were initially developed to stabilise aqueous suspensions of "traditional" mineral matter (i.e. those free of polymeric binders, and not obtained by the process according to the present invention). Previously, document CA 2 081 831, published in 1993, described the use of such products to stabilise an aqueous suspension of calcium carbonate, and notably the use of derivatives of cellulose (such as cellulose carboxymethyl), of acrylic thickening agents (which can be associative) and even of xanthan gum.

As for the problem of foaming, the solution proposed in the examples of this document consists of the use of anti-foaming agents, such as Nopco™ NXZ, sold by the company COGNIS™ and Defoamer™ 643, previously sold by the company RHONE POULENC™; both these products consist of petroleum cut oils. Such products are widely used in processes to manufacture aqueous suspensions of "traditional" mineral matter (to use the expression formerly employed), in the same way as sililated products or silicones. As an example, previously, document JP 53 053598, of 1978, described the use of silicones to reduce the presence of foam in an aqueous suspension of calcium carbonate.

Unlike the previous 2 documents which use a dispersing agent before and/or during the grinding stage, document WO 2006/016036 describes a process to manufacture a suspension of mineral matter in water, by grinding in the presence of binders for paints, followed by the introduction of a dispersing agent. This document proposes stable values for the Brookfield™ viscosity at 100 rpm, for 8 days, for the suspensions obtained. Firstly it uses no test enabling the phenomenon of sedimentation of the particles in an aqueous suspension to be quantified directly. Secondly it indicates no character of stability over periods greater than 8 days, and notably over periods of the order of 1 month, which are those referred to in the present application in terms of the anti-sedimentation effect. Finally, it provides no information for the skilled man in the art as to a possible solution to counter the formation of foam.

At the same time, document WO 2006/008657 describes a process for preparation of self-binding pigmentary particles by grinding in water of a pigmentary matter and a binder with, in one aspect of the invention, a dispersing agent then being introduced into the resulting suspension. Examples 4 and 5 disclose the joint use of a dispersing agent and of a wetting agent, both in a direct emulsion, with a view to obtaining stabilisation of the Brookfield™ viscosity at 100 rpm over a period of 14 days: nothing is proposed in terms of the anti-sedimentation effect, and no measurement was made over periods of the order of 1 month. Finally, this document contains no teaching concerning the manner of addressing foaming problems when the operation to grind the pigmentary matter and the binders in an aqueous medium is accomplished.

Therefore, with a view to resolving the twin problem of the formation of foam and of sedimentation in aqueous suspensions of self-binding pigmentary particles, obtained by grinding in an aqueous medium of at least one mineral matter and at least one binder, the state of the technique teaches the skilled man in the art to use 2 separate solutions, which consist respectively of:

the use of well-known anti-foaming agents, which are petroleum cut oils, sililated products and silicones,
and the use of cellulosic or acrylic (possibly associative) thickening agents in a direct emulsion, or of xanthan gum, both these solutions are notably known and described in processes for manufacture of aqueous suspensions of mineral matter, by grinding and/or dispersion (but without a polymer binder).

Continuing its research in this field, the Applicant has developed a process for preparation of self-binding pigmentary particles, in which a reverse emulsion formed by a dispersion in an oily phase of water particles and at least one polymer of acrylamide with an acrylic monomer is used at a specific point in the process, the latter acting as an anti-sedimentation and foam-reducing agent.

Advantageously, the presence of foam and the phenomenon of sedimentation over a period at least equal to one month are greatly reduced relative to the same suspension not containing the said reverse emulsion. In a particularly advantageous manner, and using a unique product which is the previously described reverse emulsion, at least equivalent results are obtained in terms of anti-foaming and anti-sedimentation effects to those obtained with the solutions of the prior art which consist of the combination of 2 products (1 anti-foaming agent and 1 anti-sedimentation agent): this represents at once a technical advance and a great simplification for the end user, who is now obliged to handle only a single product.

As indicated above, the state of the technique relative to processes of grinding in an aqueous medium of at least one mineral matter and at least one binder did not disclose or suggest such a solution consisting of a single product: on the contrary, to counter the problems of foam and sedimentation in suspensions of self-binding pigmentary particles obtained, it taught the joint use of a cellulosic or acrylic (possibly associative) thickening agent or of xanthan gum, and of an anti-foaming agent in the form of a blend of oils based on petroleum cuts, of a sililated product or of a silicone-based product.

The Applicant acknowledges that the particular reverse emulsions use of which is claimed in the present application have already been known as such, for many years: thus, previously, document GB 841 127, published in 1960, described a process of polymerisation in reverse emulsion of acrylic acid and acrylamide. Such emulsions have gradually found applications, notably as thickening agents, in technical fields far from that referred to by the present application, such as cosmetics, pharmacology or again detergence. Thus, document U.S. Pat. No. 6,136,305 describes a reverse emulsion of a copolymer of acrylamide and of another polyfunctional monomer, used as a thickening agent in cosmetic applications.

The Applicant has therefore successfully identified, in technical fields far removed from that of the present invention, the solution which would enable it to resolve the technical problem posed for it. Without wishing to be bound to any particular theory, the Applicant believes that the use of reverse emulsions according to the invention enables the presence of foam to be reduced greatly through the use of oils comprising the continuous phase of the said reverse emulsion, whilst resolving the problem of sedimentation by means of the polymer of acrylamide with an acrylic monomer which, with water, constitutes the dispersed phase of the said reverse emulsion.

The object of the invention therefore consists of a process for the preparation of self-binding pigmentary particles, dry or in aqueous suspension or dispersion, comprising the following stages:

a) forming one or more aqueous suspensions of at least one pigmentary matter and introducing it or them into a mill with a view to stage c);
b) forming or taking one or more aqueous solutions or suspensions or emulsions of at least one binder and introducing it or them in a mill with a view to stage c), and/or forming or taking one or more dry binder or binders and introducing it or them in a mill with a view to stage c);
c) co-grinding the aqueous suspension or suspensions obtained in stage a) with the aqueous solutions or suspensions or emulsions and/or the dry binder or binders obtained in stage b) so as to obtain an aqueous suspension of self-binding pigmentary particles;
d) possibly co-grinding the aqueous suspension obtained in stage c) with one or more aqueous solutions or suspensions or emulsions of at least one binder;
e) possibly increasing the concentration of the aqueous suspension obtained in stage c) or d) by thermal and/or mechanical concentration;
f) possibly dispersing the aqueous suspension obtained in stage e) through the use of at least one dispersing agent;
g) possibly drying the aqueous suspension obtained in stage c) or in stage d) or in stage e) or in stage f);

and characterised in that a reverse emulsion formed from a dispersion in an oily phase of water particles and at least one polymer of acrylamide with an acrylic monomer is introduced into the process following stage c) and any possible stage d),
preferentially following the accomplishment of stage e),
more preferentially following the accomplishment of stage f)
and even more preferentially before any possible stage g).

The object of the invention also consists of a process for the preparation of self-binding pigmentary particles, dry or in aqueous suspension or dispersion, comprising the following stages:

a) forming one or more aqueous suspensions of at least one pigmentary matter and introducing it or them into a mill with a view to stage c);
b) forming or taking one or more aqueous solutions or suspensions or emulsions of at least one binder and introducing it or them in a mill with a view to stage c), and/or forming or taking one or more dry binder or binders and introducing it or them in a mill with a view to stage c);

c) co-grinding the aqueous suspension or suspensions obtained in stage a) with the aqueous solutions or suspensions or emulsions and/or the dry binder or binders obtained in stage b) so as to obtain an aqueous suspension of self-binding pigmentary particles;

d) possibly co-grinding the aqueous suspension obtained in stage c) with one or more aqueous solutions or suspensions or emulsions of at least one binder;

e) possibly increasing the concentration of the aqueous suspension obtained in stage c) or d) by thermal and/or mechanical concentration;

f) possibly dispersing the aqueous suspension obtained in stage e) through the use of at least one dispersing agent;

g) possibly drying the aqueous suspension obtained in stage c) or in stage d) or in stage e) or in stage f);

and characterised in that a reverse emulsion formed from a dispersion in an oily phase of water particles and at least one polymer of acrylamide with an acrylic monomer is introduced into the process before and/or during stage c).

The term binder used in the present application refers to any natural or synthetic product of an organic nature, having binding properties. These binding properties, which increase the inter-particle cohesion forces of the initial mineral, are determined according to the method described in example 1 of document WO 2006/008657.

It will be noted that preferentially the said reverse emulsion is used after stage c).

In a preferred a embodiment of the process according to the invention comprising the possible stage d), the said reverse emulsion is used after stage d).

Finally, another preferred embodiment consists in the said reverse emulsion being used preferentially following the accomplishment of stage e), more preferentially following the accomplishment of stage f)

and even more preferentially before any possible stage g)

The various forms of the process according to the invention will be easily conceivable by the skilled man in the art. He will understand that he would be able, for example, to use the process of the invention by undertaking at least stages a), b), c) and g) in order to obtain the said self-binding pigmentary particles in dry form before reforming a suspension of the said self-binding pigmentary particles and finally before introducing the said reverse emulsion.

This process is also characterised in that the said reverse emulsion contains, relative to its total weight (where the sum of the percentages is equal to 100%):

10 to 70% by weight of water,
10 to 60% by weight of oil,
10 to 40% by weight of at least one polymer of acrylamide with an acrylic monomer,
1 to 5% by weight of surfactants.

This process is also characterised in that the polymer of acrylamide with an acrylic monomer is possibly totally or partially neutralised by one or more neutralisation agents, preferentially chosen from among ammonia, sodium hydroxides, potassium and their blends, where the neutralisation agent is very preferentially ammonia.

This process is also characterised in that the polymer of acrylamide with an acrylic monomer has a molecular weight of between $10^5$ and $10^7$ g/mole.

This process is also characterised in that the ratio by weight of acrylamide:acrylic monomer is between 10:90 and 90:10, and preferentially between 20:80 and 80:20. This process is also characterised in that the acrylic monomer is chosen from among acrylic acid, methacrylic acid and their blends, and is preferentially acrylic acid.

This process is also characterised in that the oily phase consists of oils which are aromatic blends and/or blends of alcanes having 6 to 20 carbon atoms, and preferentially 12 to 18 carbon atoms.

This process is also characterised in that the said process uses 300 to 3,000 ppm of the said reverse emulsion, relative to the dry weight of pigmentary matter and of polymeric binder.

This process is also characterised in that the pigmentary matter is chosen from among metal oxides, hydroxides, sulphites, silicates and carbonates, such as calcium carbonate, dolomites, kaolin, talc, gypsum, titanium dioxide, satin white or aluminium trihydroxide and their blends.

Preferentially, the pigmentary matter is a carbonate chosen from among synthetic or natural calcium carbonate and their blends.

It is even more preferentially a natural calcium carbonate, such as chalk, marble, calcite, limestone, or their blends.

The process according to the invention is also characterised in that the aqueous suspension or suspensions of pigmentary matter formed in stage a) containing 1% to 80% by dry weight of pigmentary matter, and preferentially contain 15% to 60% by dry weight of pigmentary matter.

This process is also characterised in that the said process uses a quantity by dry weight of polymeric binder less than 20%, preferentially less than 10%, and very preferentially less than 5%, of the dry weight of pigmentary matter.

This process is also characterised in that the binder is chosen from among the semi-crystalline binders, binders with a polyvinylic alcohol base, polyvinyl acetate, starch, casein, proteins, carboxymethylcellulose (CMC), ethylhydroxyethylcellulose (EHEC), copolymers of acrylic esters, and their blends.

In a preferential manner, the binder or binders are semi-crystalline latexes, and more preferentially are polyethylene or copolymers in the neutralised form of polyethylene with other monomer units such as acrylic acid or other monomers, or their blends.

The process according to the invention is also characterised in that the binder or binders of stage b) are in the form of one or more aqueous solutions or suspensions or emulsions, or in the form of dry granulates.

In a preferential manner, this process is also characterised in that the binder or binders of stage b) are in the form of one or more aqueous solutions or suspensions or emulsions.

When the binder or binders of stage b) are used in the form of one or more aqueous solutions or suspensions or emulsions, the process according to the invention is also characterised in that the aqueous solutions or suspensions or emulsions of at least one binder formed in stage b) contain 1% to 60% by weight of at least one binder, and more preferentially 5% to 50% by weight of at least one binder.

When the binder or binders of stage b) is/are used in the form of an emulsion, the process according to the invention is also characterised in that the binder or binders are emulsions of waxes of polyethylene or copolymers in the neutralised form of polyethylene with other monomer units such as acrylic acid or other monomers, latex emulsions of copolymers of acrylic esters, or their blends.

The process according to the invention is also characterised in that the suspension formed in stage c) has a ratio of pigmentary matter:binders contained in the suspension obtained of between 99:1 and 1:99, and preferentially between 90:10 and 10:90, expressed as weight proportions.

This process is also characterised in that the process is adapted in order to obtain, in stage c), self-binding pigmentary particles with an average particle diameter of between 0.1 µm and 10 µm, and preferentially of between 0.1 µm and 2 µm measured using a MasterSizer™ S granulometer sold by the company MALVERN (with 3PHD presentation).

This process is also characterised in that no dispersing agent is used before and/or during stage c), grinding.

This process is also characterised in that a dispersing agent is also used before and/or during stage c), grinding.

In a preferential manner the process according to the invention is characterised in that no dispersing agent is used in stage c).

This process is also characterised in that a dispersing agent is used in stage f).

When a dispersing agent is used in the process according to the invention, it will be noted that the latter can, possibly, also act as a wettability agent, i.e. that it acts in order to make a partially or totally hydrophobic surface partially or totally hydrophilic.

In a preferential manner, the dispersing agent or agents are chosen from among the organic compounds well known to the skilled man in the art giving a steric or electrostatic stabilisation.

In a preferential manner, when at least one dispersing agent is used in stage f), 0.01% to 5%, and preferentially 0.01% to 2%, by weight of dispersing agent is used in stage f).

The process according to the invention is also characterised in that stage g) is undertaken in order to obtain dry self-binding pigmentary particles.

Another object of the present invention is the dry self-binding pigmentary particles obtained by the process according to the invention implementing stage g).

These dry self-binding pigmentary particles are also characterised in that they have an average particle diameter of between 5 µm and 100 µm, and preferentially of between 10 µm and 30 µm, as measured using a MasterSizer™ S granulometer sold by the company MALVERN (with 3PHD presentation).

These dry self-binding pigmentary particles are also characterised in that they are self-binding as defined in example 1 of WO 2006/008657.

These dry self-binding pigmentary particles are also characterised in that when they are put in an aqueous suspension they sediment less rapidly than self-binding pigmentary particles formed by an identical process not using the said reverse emulsion.

Another object of the present invention is the aqueous suspension of self-binding pigmentary particles, characterised in that it is obtained by the process according to the invention.

This aqueous suspension of self-binding pigmentary particles is also characterised in that the pigmentary particles are self-binding as defined in example 1 of WO 2006/008657.

This aqueous suspension of self-binding pigmentary particles is also characterised in that the self-binding pigmentary particles sediment less rapidly than a suspension of self-binding pigmentary particles formed by an identical process not using the said reverse emulsion.

This aqueous suspension of self-binding pigmentary particles is also characterised in that it contains between 5% and 80% by weight of pigmentary matter, between 1% and 30% by weight of binders, between 0.03% and 0.3% by weight of reverse emulsion, and between 19% and 94% by weight of water, and preferentially in that it contains between 20% and 40% by weight of pigmentary matter, between 5% and 20% by weight of binders, between 0.03% and 0.3% by weight of reverse emulsion, and between 40% and 75% by weight of water.

EXAMPLES

Example 1

This example illustrates the use, in a manufacturing process, of an aqueous suspension of self-binding pigmentary particles with a calcium carbonate and styrene-butadiene binder base.

Process of Manufacture of Self-Binding Pigmentary Particles

Initially, one begins by preparing a concentrated aqueous dispersion of self-binding pigmentary particles, according to the following procedure.

In a Dyno-Mill™-type grinder with a fixed cylinder, a rotating impeller, the grinding body of which consists of glass balls of a diameter of between 1 and 1.4 mm, the following is ground, in an aqueous medium:

- calcium carbonate which is a Norwegian marble, the median diameter of which (measured using a Sedigraph™ 51 sold by the company MICROMERITICS™) is equal to 0.8 µm,
- a styrene-acrylic binder sold by the company BASF™ under the name Acronal™ S728,
- another binder which is a copolymer of ethylene and of acrylic acid, and sold by the company BASF™ under the name Polygen™ WE4.

The quantities of water, of calcium carbonate and of the 2 binders are adjusted such that:

- the dry weight content of calcium carbonate and of the 2 binders is equal to 20% of the total weight of the suspension obtained after grinding,
- the ratio by dry weight calcium carbonate/Acronal™ S728/Polygen™ WE4 is equal to 100/9.5/0.5.

The density of the grinding body is equal to 1.8 g/cm$^3$.

The grinding chamber has a volume equal to 600 cm$^3$.

The circumferential speed of the mill is equal to 10 m·s$^{-1}$.

After grinding one therefore obtains an aqueous suspension of self-binding pigmentary particles the median diameter of which (measured using a Sedigraph™ 5100 sold by the company MICROMERITICS™) is equal to 0.5 µm.

This suspension is then concentrated to a content by dry weight of calcium carbonate and of the 2 binders equal to 40% of its total weight, using a centrifuge of the Rouan XYX type rotating at 5,500 revolutions per minute.

The suspension obtained is finally dispersed, with the introduction of 0.5% by dry weight of a polymer of acrylic acid, methacrylic acid, styrene and butyl acrylate, and of 0.1% by dry weight of a polymer of acrylic acid and of maleic anhydride (where these quantities are relative to the dry weight of calcium carbonate and of the 2 binders).

With the exception of test n° 1, which is a control, one then adds for each of the tests n° 2 to 15 a product according to the invention or a product according to the prior art, or a blend of 2 products of the prior art. The products are identified by letters the meaning of which is given below. Tests n° 2 to 9 use 1,000 ppm of an anti-foaming agent or an anti-sedimentation agent of the prior art. Tests n° 10 to 14 use 1,000 ppm of an anti-foaming agent and 1,000 ppm of an anti-sedimentation agent of the prior art. Tests n° 15 to 17 used 2,000 ppm of the reverse emulsion according to the invention.

Names are attributed as follows:

"anti-sedimentation agent 1 of the prior art" is given to a thickening agent which is a HASE-type associative acrylic polymer, sold by the company COATEX™ under the name Thixol™ 53 L, and noted A1;

"anti-sedimentation agent 2 of the prior art" is given to a thickening agent which is a HASE-type associative acrylic polymer, sold by the company ROHM & HAAS™ under the name Acrysol™ TT 945, and noted A2;

"anti-sedimentation agent 3 of the prior art" is given to a thickening agent which is an ASE-type associative acrylic polymer, sold by the company COATEX™ under the name Viscoatex™ 46, and noted A3;

"anti-sedimentation agent 4 of the prior art" is given to a cellulose hydroxyethyl, sold by the company AKZO NOBEL™ under the name Bermocoll™ EM 700 FQ, and noted A4;

"anti-sedimentation agent 5 of the prior art" is given to a xanthan gum, sold by the company RHODIA™ under the name Rhodigel™, and noted A5

"anti-foaming agent 1 of the prior art" is given to a formulation of mineral oils, sold by the company NOPCO™ under the name NOPCO™ NXZ, and noted B1;

"anti-foaming agent 2 of the prior art" is given to a direct aqueous emulsion of polydimethylsiloxanes, sold by the company RHODIA™ under the name Rhodosil™ 422, and noted B2;

"anti-foaming agent 3 of the prior art" is given to an emulsion of silicones and hydrophobes, sold by the company BYK™ under the name Byk™ 022, and noted B 3;

"anti-foaming and anti-sedimentation agent according to the invention" is given to a reverse emulsion which consists of the dispersion in an oily phase of water and of a polymer of acrylamide with acrylic acid, sold by the company COATEX™ under the name M1201, and noted C; this dispersion consists 15% by weight of water, 52% by weight of an oily phase consisting of a blend of oils derived from petroleum cuts, and having between 12 and 18 carbon atoms, 3% by weight of surfactants, and 30% of a reverse emulsion of a polymer of acrylic acid and of acrylamide in a mass ratio of 20:80, and of molecular weight close to 3,000,000 g/mole;

"anti-foaming and anti-sedimentation agent according to the invention" is given to a dispersion consisting of 15% by weight of water, 47% by weight of an oily phase consisting of a blend of oils derived from petroleum cuts and having between 12 and 18 carbon atoms, 3% by weight of surfactants, and 35% of a reverse emulsion of a polymer of acrylic acid and of acrylamide in a mass ratio of 25:75, and of molecular weight close to 5,000,000 g/mole, and noted C';

"anti-foaming and anti-sedimentation agent according to the invention" is given to a dispersion consisting of 15% by weight of water, 47% by weight of an oily phase consisting of a blend of oils derived from petroleum cuts and having between 12 and 18 carbon atoms, 3% by weight of surfactants, and 35% of a reverse emulsion of a polymer of acrylic acid and of acrylamide in a mass ratio of 30:70, and of molecular weight close to 5,500,000 g/mole, and noted C'';

Measurement of the Anti-Sedimentation Effect

For each of the aqueous suspensions of self-binding pigmentary particles obtained according to tests n° 1 to 17, 1 liter of suspension is sampled immediately after its manufacture, and it is introduced into a 5-liter glass receptacle. At instants t=14 days and t=28 days, the following are determined by measurement:

the height of the supernatant which consists of water, the height of the sediment which consists for the most part of self-binding pigmentary particles.

Both these heights are expressed as percentages of the total height of the aqueous suspension in the receptacle, and noted s14 and d14 respectively for the supernatant and the sediment after 14 days, and s28 and d28 respectively for the supernatant and the sediment after 28 days. The higher these percentages, the greater the sedimentation phenomenon.

The results are shown in table 1.

Measurement of the Anti-Foaming Effect

For each of the aqueous suspensions of self-binding pigmentary particles obtained according to tests n° 1 to 15, 700 ml is sampled and then stirred for 30 seconds in a Hamilton Beach™-type agitator set at a High position.

After 30 seconds of rest, the experimental density □ of the system is determined by pychnometry. The relative error is of the order of 5% for the final measurement.

The density of the 2 binders is equal to 1.0, and that of the calcium carbonate is equal to 2.7.

It is recalled that the content by dry weight of calcium carbonate and of the 2 binders is equal to 40% of the total weight of the suspension, and that the ratio by dry weight calcium carbonate/Acronal™ S728/Polygen™ WE4 is equal to 100/9.5/0.5

It is deduced from the foregoing that the theoretical density of the concentrated dispersion of self-binding pigmentary particles (without foam) is equal to 1,299.

The weaker the experimental density is found to be, the greater is the presence of foam. The results are shown in table 1.

Table 1 enables it to be shown, firstly, that the anti-sedimentation agents of the prior art indeed enable the stability of the suspensions obtained to be improved, but that they have no anti-foaming effect; at the same time, the anti-foaming agents of the prior art enable the presence of foam in the suspensions to be reduced, but have no effect on the sedimentation phenomenon (case of tests n° 2 to 9).

When a blend consisting of 2,000 ppm of these products is used (1,000 ppm of anti-foaming agent and 1,000 ppm of anti-sedimentation agent), the quantity of foam is reduced and the stability of the suspensions is improved: this solution represents the combinations of the prior art (case of tests n° 10 to 14).

If, finally, 2,000 ppm of the reverse emulsions according to the invention are used (tests n° 15 to 17), the quantity of foam and the sedimentation phenomenon of the suspended particles are reduced in the same proportions as the combinations of the prior art (tests n° 10 to 14). These results therefore clearly demonstrate that only the tests using the invention enable, by means of a single product used in the same quantity as the 2 products of the prior art, the quantity of foam and the sedimentation phenomenon to be minimised, at a level of efficiency at least equal to that attained by the solutions of the prior art.

TABLE 1

| | Test No. | | | | | | | | | | | | | | | | |
|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 << |
| Control (T)Prior Art (PA) Invention (IN) | T | PA | PA | PA | PA | PA | PA | PA | PA | PA | PA | PA | PA | PA | IN | IN | IN |
| | — | A1 | A2 | A3 | A4 | A5 | B1 | B2 | B3 | A1 B1 | A2 B2 | A3 B3 | A4 B1 | A5 B1 | C | C' | C'' |
| $\rho$ (g/cm$^3$) | 1.087 | 1.088 | 1.089 | 1.087 | 1.087 | 1.090 | 1.195 | 1.190 | 1.187 | 1.193 | 1.188 | 1.191 | 1.194 | 1.192 | 1.192 | 1.192 | 1.192 |
| $s_{14}$ (%) | 18 | 4 | 5 | 4 | 5 | 6 | 18 | 18 | 18 | 4 | 5 | 3 | 4 | 6 | 3 | 3 | 3 |
| $s_{28}$ (%) | 25 | 6 | 6 | 6 | 7 | 9 | 25 | 25 | 25 | 6 | 7 | 6 | 7 | 9 | 6 | 5 | 5 |
| $d_{14}$ (%) | 5 | 0 | 1 | 0 | 1 | 2 | 5 | 5 | 5 | 0 | 1 | 1 | 1 | 2 | 0 | 0 | 0 |
| $d_{28}$ (%) | 12 | 1 | 2 | 2 | 2 | 3 | 12 | 12 | 12 | 1 | 2 | 2 | 3 | 3 | 1 | 1 | 1 |

The invention claimed is:

1. A process for the preparation of self-binding pigmentary particles, dry or in aqueous suspension or dispersion, comprising the following stages:
   a) forming or obtaining one or more aqueous suspensions of at least one pigmentary matter;
   b) forming or obtaining one or more aqueous solutions or suspensions or emulsions of at least one binder, and/or forming or obtaining one or more dry binder or binders;
   c) co-grinding the aqueous suspension or suspensions formed or obtained in stage a) with the aqueous solutions or suspensions or emulsions and/or the dry binder or binders formed or obtained in stage b) so as to obtain an aqueous suspension of self-binding pigmentary particles;
   d) possibly co-grinding the aqueous suspension obtained in stage c) with one or more aqueous solutions or suspensions or emulsions of at least one binder;
   e) possibly increasing the concentration of the aqueous suspension obtained in stage c) or d) by thermal and/or mechanical concentration;
   f) possibly dispersing the aqueous suspension obtained in stage e) through the use of at least one dispersing agent;
   g) possibly drying the aqueous suspension obtained in stage c) or in stage d) or in stage e) or in stage f);
   wherein a reverse emulsion formed from a dispersion in an oily phase of water particles and at least one polymer of acrylamide with an acrylic monomer is introduced into the process:
       before and/or during stage c),
       following stage c) and any possible stage d),
       following the accomplishment of stage e),
       following the accomplishment of stage f), or
       before any possible stage g).

2. The process according to claim 1, wherein the reverse emulsion comprises, relative to its total weight (where the sum of the percentages is equal to 100%):
   10 to 70% by weight of water,
   10 to 60% by weight of oil,
   10 to 40% by weight of at least one polymer of acrylamide with an acrylic monomer, and
   1 to 5% by weight of surfactants.

3. The process according to claim 1, wherein the polymer of acrylamide with an acrylic monomer is totally or partially neutralized by one or more neutralization agents.

4. The process according to claim 3, wherein the one or more neutralization agents is ammonia, sodium hydroxide, potassium or their blends.

5. The process according to claim 3, wherein the one or more neutralization agents is ammonia.

6. The process according to claim 1, wherein the polymer of acrylamide with the acrylic monomer has a molecular weight of between $10^5$ and $10^7$ g/mole.

7. The process according to claim 1, wherein the acrylamide and the acrylic monomer are present at a ratio by weight of acrylamide:acrylic monomer of between 10:90 and 90:10.

8. The process according to claim 1, wherein the acrylamide and the acrylic monomer are present at a ratio by weight of acrylamide:acrylic monomer of between 20:80 and 80:20.

9. The process according to claim 1, wherein the acrylic monomer is acrylic acid, methacrylic acid or their blends.

10. The process according to claim 1, wherein the acrylic monomer is acrylic acid.

11. The process according to claim 1, wherein the oily phase comprises oils which are aromatic blends and/or blends of alcanes having 6 to 20 carbon atoms.

12. The process according to claim 1, wherein the oily phase comprises oils which are aromatic blends and/or blends of alcanes having 12 to 18 carbon atoms.

13. The process according to claim 1, wherein the process uses 300 to 3,000 ppm of the reverse emulsion, relative to the dry weight of pigmentary matter and of polymeric binder.

14. The process according to claim 1, wherein the pigmentary matter is chosen from metal oxides, hydroxides, sulphites, silicates, carbonates, calcium carbonate, dolomites, kaolin, talc, gypsum, titanium dioxide, satin white or aluminium trihydroxide or their blends.

15. The process according to claim 1, wherein the pigmentary matter is synthetic or natural calcium carbonate or their blends.

16. The process according to claim 1, wherein the pigmentary matter is a natural calcium carbonate comprising chalk, marble, calcite, limestone, or their blends.

17. The process according to claim 1, wherein the aqueous suspension or suspensions of pigmentary matter formed or obtained in stage a) contain 1% to 80% by dry weight of pigmentary matter.

18. The process according to claim 1, wherein the aqueous suspension or suspensions of pigmentary matter formed or obtained in stage a) contain 15% to 60% by dry weight of pigmentary matter.

19. The process according to claim 1, wherein the process uses a quantity by dry weight of the polymeric binder of less than 20% of the dry weight of pigmentary matter.

20. The process according to claim 1, wherein the process uses a quantity by dry weight of the polymeric binder of less than 10% of the dry weight of pigmentary matter.

21. The process according to claim 1, wherein the process uses a quantity by dry weight of the polymeric binder of less than 5% of the dry weight of pigmentary matter.

22. The process according to claim 1, wherein the binder is chosen from semi-crystalline binders, binders with a polyvinylic alcohol base, polyvinyl acetate, starch, casein, proteins, carboxymethylcellulose (CMC), ethylhydroxyethylcellulose (EHEC), copolymers of acrylic esters, or their blends.

23. The process according to claim 1, wherein the binder is a semi-crystalline binder chosen from polyethylene or copolymers in neutralized form of polyethylene with other monomer units or their blends.

24. The process according to claim 23, wherein the other monomer units are acrylic acid.

25. The process according to claim 1, wherein the binder or binders in stage b) are in the form of dry granulates.

26. The process according to claim 1, wherein the binder or binders in stage b) are in the form of one or more aqueous solutions or suspensions or emulsions.

27. The process according to claim 26, wherein the aqueous solutions or suspensions or emulsions of at least one binder formed in stage b) contain 1% to 60% by weight of at least one binder.

28. The process according to claim 26, wherein the aqueous solutions or suspensions or emulsions of at least one binder formed in stage b) contain 5% to 20% by weight of at least one binder.

29. The process according to claim 1, wherein the binder or binders of stage (b) are in the form of emulsion or emulsions of polyethylene waxes or copolymers in neutralized form of polyethylene with other monomer units such as acrylic acid or other monomers, latex emulsions of copolymers of acrylic esters, or their blends.

30. The process according to claim 1, wherein the binder or binders of stage (b) is a styrene-acrylic binder, a copolymer of ethylene and acrylic acid, or a combination thereof.

31. The process according to claim 1, wherein the aqueous suspension of self-binding pigmentary particles obtained in stage c) comprises pigmentary matter:binders at a ratio of between 99:1 and 1:99, expressed as weight proportions.

32. The process according to claim 1, wherein the aqueous suspension of self-binding pigmentary particles obtained in stage c) comprises pigmentary matter:binders at a ratio of between 90:10 and 10:90, expressed as weight proportions.

33. The process according to claim 1, wherein the self-binding pigmentary particles obtained in stage c) have an average particle diameter of between 0.1 μm and 10 μm.

34. The process according to claim 1, wherein the self-binding pigmentary articles obtained in stage c) have an average particle diameter of between 0.1 μm and 2 μm.

35. The process according to claim 1, wherein no dispersing agent is used before and/or during stage c).

36. The process according to claim 1, wherein a dispersing agent is used before and/or during stage c).

37. The process according to claim 1, wherein stage d) is implemented.

38. The process according to claim 1, wherein stage e) is implemented.

39. The process according to claim 1, wherein stage f) is implemented.

40. The process according to claim 39, wherein the at least one dispersing agent is chosen from organic compounds giving steric or electrostatic stabilization.

41. The process according to claim 39, wherein 0.01% to 5% by weight of at least one dispersing agent is added in stage f).

42. The process according to claim 39, wherein 0.01% to 2% by weight of at least one dispersing agent is added in stage f).

43. The process according to claim 1, wherein stage g) is implemented.

44. The process according to claim 10, wherein stage g) is implemented.

45. The process according to claim 30, wherein stage g) is implemented.

46. A composition of dry self-binding pigmentary particles obtained by the process according to claim 43, wherein the self-binding pigmentary particles sediment in an aqueous suspension less rapidly than a self-binding pigmentary particles formed by an identical process not using the reverse emulsion.

47. A composition of dry self-binding pigmentary particles obtained by the process according to claim 44, wherein the self-binding pigmentary particles sediment in an aqueous suspension less rapidly than a self-binding pigmentary particles formed by an identical process not using the reverse emulsion.

48. A composition of dry self-binding pigmentary particles obtained by the process according to claim 45, wherein the self-binding pigmentary particles sediment in an aqueous suspension less rapidly than a self-binding pigmentary particles formed by an identical process not using the reverse emulsion.

49. The composition of dry self-binding pigmentary particles according to claim 46, having an average particle diameter of between 5 μm and 100μm.

50. The composition of dry self-binding pigmentary particles according to claim 46, having an average particle diameter of between 10 μm and 30 μm.

51. An aqueous suspension of self-binding pigmentary particles obtained by the process according to claim 1, wherein the self-binding pigmentary particles sediment in an aqueous suspension less rapidly than a suspension of self-binding pigmentary articles formed by an identical process not using the reverse emulsion.

52. An aqueous suspension of self-binding pigmentary particles obtained by the process according to claim 10, wherein the self-binding pigmentary particles sediment in an aqueous suspension less rapidly than a suspension of self-binding pigmentary particles formed by an identical process not using the reverse emulsion.

53. An aqueous suspension of self-binding pigmentary particles obtained by the process according to claim 30, wherein the self-binding pigmentary particles sediment in an aqueous suspension less rapidly than a suspension of self-binding pigmentary particles formed by an identical process not using the reverse emulsion.

54. The aqueous suspension of self-binding pigmentary particles according to claim 52, comprising between 5% and 80% by weight of pigmentary matter, between 1% and 30% by weight of binders, between 0.03% and 0.3% by weight of reverse emulsion, and between 19% and 94% by weight of water.

55. The aqueous suspension of self-binding pigmentary particles according to claim 52, comprising between 20% and 40% by weight of pigmentary matter, between 5% and 20% by weight of binders, between 0.03% and 0.3% by weight of reverse emulsion, and between 40% and 75% by weight of water.

* * * * *